(12) United States Patent
Resing et al.

(10) Patent No.: US 7,073,316 B2
(45) Date of Patent: Jul. 11, 2006

(54) HARVESTING IMPLEMENT FOR HARVESTING STALK-LIKE PLANTS

(75) Inventors: Alfons Resing, Stadtlohn (DE); Richard Wuebbels, Rhede (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/659,224

(22) Filed: Sep. 10, 2003

(65) Prior Publication Data

US 2004/0107685 A1    Jun. 10, 2004

(30) Foreign Application Priority Data

Sep. 14, 2002    (DE)    ................... 102 42 796

(51) Int. Cl.
   *A01D 45/02*    (2006.01)
(52) U.S. Cl. ....................................... 56/119
(58) Field of Classification Search ............... 56/504, 56/502, 503, 119, 126
   See application file for complete search history.

(56) References Cited

U.S. PATENT DOCUMENTS

| | | | |
|---|---|---|---|
| 1,179,292 A | 4/1916 | Dingman | |
| 1,777,112 A | 9/1930 | Baker | |
| 2,817,941 A * | 12/1957 | Clapsaddle, Jr. | 56/119 |
| 2,949,717 A | 8/1960 | Johannesen | 56/23 |
| 3,812,661 A | 5/1974 | Baker | 56/14.4 |
| 3,967,439 A * | 7/1976 | Mott | 56/314 |
| 4,219,992 A * | 9/1980 | Henry, Sr. | 56/119 |
| 4,589,250 A * | 5/1986 | Faul, Jr. | 56/126 |
| 2002/0020162 A1 | 2/2002 | Wubbels et al. | 56/503 |
| 2002/0035826 A1 * | 3/2002 | Albinger et al. | 56/109 |
| 2003/0079458 A1 | 5/2003 | Wubbels et al. | 56/52 |

FOREIGN PATENT DOCUMENTS

| | | |
|---|---|---|
| DE | 675 639 | 5/1939 |
| DE | 679 096 | 7/1939 |
| DE | 1 019 855 | 11/1957 |
| DE | 1 217 128 | 5/1966 |
| DE | 73 42 482 | 11/1973 |
| DE | 36 16 231 C2 | 11/1987 |
| DE | 197 29 938 A1 | 2/1998 |
| EP | 45015 A1 * | 2/1982 |
| EP | 539745 A1 * | 5/1993 |
| EP | 0 780 050 B1 | 6/1997 |
| EP | 1036495 A1 * | 9/2000 |
| EP | 1 106 049 | 6/2001 |
| EP | 1 106 049 A1 | 6/2001 |
| EP | 1142467 A1 * | 10/2001 |
| EP | 1 161 857 A1 | 12/2001 |
| EP | 1179292 A1 * | 2/2002 |
| EP | 1295523 A1 * | 3/2003 |
| EP | 1396185 A2 * | 3/2004 |
| FR | 2 037 437 | 12/1970 |

OTHER PUBLICATIONS

Translation of Already Cited Reference: English Abstract EP 45015 A1, Pubn Date Feb. 1982.*

* cited by examiner

Primary Examiner—Árpád Fábián Kovács

(57) ABSTRACT

A harvesting implement for the harvesting of stalk-like plants comprising an intake arrangement for taking up plants located on a field and a stalk divider arranged ahead of the intake arrangement in the forward direction. The crop divider is supported in bearings so that it is free to move relative to the intake arrangement when it is in its harvesting position. The stalk divider is free to move in the sideways direction, that extends transverse to the forward direction.

14 Claims, 4 Drawing Sheets

HARVESTING IMPLEMENT FOR HARVESTING STALK-LIKE PLANTS

FIELD OF THE INVENTION

The present invention is directed to a harvesting implement for harvesting stalk-like plants, with at least one intake arrangement for the intake of stalk-like plants standing on a field and at least one stalk divider arranged in the forward operating direction ahead of the intake arrangement, that is supported in bearings so as to be able to move relative to the intake arrangement.

BACKGROUND OF THE INVENTION

EP 1 161 857 A describes a picker for the harvesting of stalk-like plants that includes a conveying element rotating about a vertical axis with drivers extending outward. The drivers grasp the plants standing on the fields and transport them in the sideways direction and to the rear, so that they reach a plucking slot. The plants are transported through the picking gap by means of two picking rolls arranged underneath the picking gap in interaction with the drivers of the conveying element. A further screw conveyor is arranged above the picking slot on the side of the picking gap opposite the conveying element, in order to simplify the introduction of the plants into the picking gap.

In the implement described there is equipped with an operating width considerably greater than that of conventional pickers that operate with gathering chains. It was therefore even considered that this implement could be used for the harvest of corn that is planted in so-called equal spaced or close spaced sowing. In equal spaced sowing, plants are planted with row spacing of 30 cm. The plants of adjoining rows are offset uniformly from each other and the spacing of the plants in a row equals 33.3 cm. The result is a hexagonal pattern with 10 plants per square meter and with equal spacing between all plants, which enhances the growth of the plants. When such a stand is harvested the result is a rather small spacing of rows, in which the dimensioning of the stalk dividers that precede the picking units becomes critical. If the stalk dividers are selected too narrow, they cannot move the plants to the side in order to conduct them to the conveying element; if, on the other hand, they are selected too wide, they can bend over the plants and shake the cobs down off the plants. Such losses are undesirable.

EP 0 780 050 A describes a harvesting implement of this class for plants planted in rows, in which a knife beam is preceded by a multitude of stalk dividers arranged to the side alongside each other. Each of the stalk dividers includes a point that is supported through a pivot bearing with a horizontal pivot axis extending transverse to the forward direction on the frame of the harvesting implement. Thereby a runner attached underneath the point can conform to varying terrain conditions in that it moves downward or upward. The aforementioned problem cannot be solved by these stalk dividers.

DE 73 42 482 U describes a one-piece front attachment corn picker in which the outer divider points can be slid in the sideways direction between a transport position and an operating position. EP 1 179 292 A describes another front harvesting attachment in which the outermost divider points are pivoted to the outside in the transport position, in order to avoid collisions between these divider points above the main frame. These two publications describe divider points that are rigidly attached to the harvesting implement during the harvesting operation and are moved in the sideways direction only during the transition from the transport position to the operating position and the reverse, and hence cannot solve the aforementioned problem.

SUMMARY OF THE INVENTION

It is an object of the present invention to provide an improved harvesting implement, in which undesirable crop losses are reduced, particularly during the harvest of stalk-like harvested crop planted with relatively close spacing.

It is a feature of the present invention that the harvesting implement is equipped with a stalk divider that can be moved transversely during the harvesting operation.

In this way the stalk divider can evade the plants in the sideways direction during the harvesting operation, so that its width can be selected to be large enough in order to accomplish an adequate guidance of the plant stalks, without, however, bending the plants to such a degree that losses of cobs or entire plants occur. The stalk divider winds its way through the stand of the plants. The stalks of the plants are gently pushed to the side by the stalk divider and are not knocked over. Thereby the harvesting implement can be applied to stands of plants that are not planted with a spacing that corresponds to the spacing between adjacent intake arrangements, for example, in equal spaced sowing.

There are various possibilities for the attachment of the stalk divider to the harvesting implement. In this way the stalk divider could be attached to the frame of the harvesting implement so as to pivot about an approximately horizontal axis. In another embodiment it is supported in an appropriate bearing arrangement so as to slide freely. The preferred solution, however, is to connect the stalk divider in joints by a self-aligning bearing, for example, a parallelogram guidance linkage to the frame of the harvesting implement. The latter includes two parallel arms that are connected to the frame and to the stalk divider (as a rule underneath it). In addition to the simple and stable configuration it is seen as an advantage that the stalk divider is pre-loaded into its rest position by the force of gravity. In the other aforementioned variations separate elements are required for this, such as springs or weights with rope pulls and deflecting elements, in case that the stalk divider is not to be supported in bearings, free to move, which would, however, basically also be conceivable.

The stalk divider may be attached rigidly, so that it does not rotate along its longitudinal axis, relative to the harvesting implement. In order to be able to take up plants that are too close to the ground to be taken up by the intake arrangement of the harvesting implement, an obvious solution is to configure the stalk divider so that it can rotate in the form of a lodged corn screw conveyor about its longitudinal axis extending in the forward direction. It can be equipped without an active drive for positively rotating the stalk divider. This drive is appropriately derived from the drive of the intake arrangement, although a separate drive would also be conceivable, for example, by means of an electric or hydraulic motor.

In order to lift plants, an obvious solution is the use of conveying elements, such as helically shaped drivers, that are arranged on the surface of the stalk divider with its round or circular cross section.

The stalk divider ends preferably in known manner in a point toward the front, in order to be able to move between the plants. If it is configured with a circular cross section, it typically has a conical shape. If the stalk divider is not to rotate about its longitudinal axis, its underside may also be flattened, so that it can be attached closer to the ground.

It is conceivable that plants become deposited upon a stalk divider during the harvesting process that were cut or bent over by an adjacent stalk divider. If the stalk divider ends in a point at the front, these plants can slide to the ground along the sloping surface of the stalk divider, from which they cannot be taken up by the harvesting implement or taken up only under difficulties. In order to solve this problem, a solution is to provide the stalk divider with several stepped sections, where the steps form edges or detents directed towards the rear. These prevent the stalks of the plants from sliding downward along the surface of the stalk divider. The steps may be relatively large and extend over the entire stalk divider. But it would also be conceivable that relatively small steps are used, like the scales on the skin of a fish that are distributed over the surface of the stalk divider.

The stalk dividers according to the invention are preferably applied to pickers. These stalk dividers are attached as a rule to pickers at the side ends of the operating width of a picking arrangement. The application of the stalk dividers according to the invention is particularly advantageous with pickers of the type described initially, since they make possible a utilization or an enlargement of the entire operating width with a picking arrangement equipped with a rotating conveying element.

DETAILED DESCRIPTION

Figure 1:
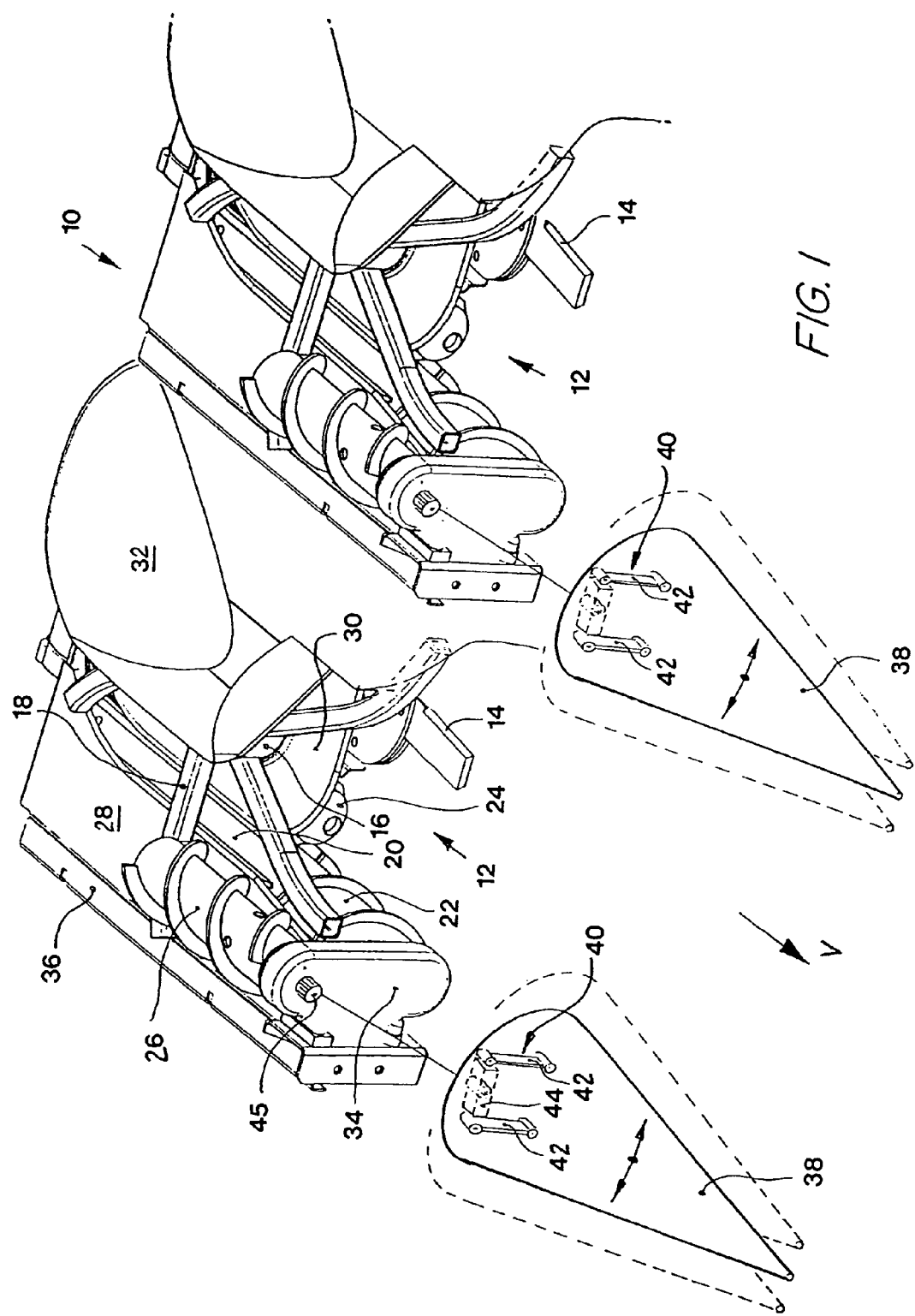
FIG. 1 is a partial perspective view of a harvesting implement according to the invention with stalk dividers in the harvesting operating position.

FIG. 1 is a perspective view of a section of a harvesting implement 10. The harvesting implement 10 includes a number of evenly spaced intake arrangements 12 arranged alongside each other. Each intake arrangement is provided with a picking arrangement for separating the desirable portion of the plant from the plant stalk. The picking arrangements are connected to each other at their rear by a carrier frame, not shown in the drawing. During the harvesting operation the carrier frame is hooked onto the feeder house of a combine or the intake channel of a forage harvester. The harvesting implement 10 is moved in a forward direction V by the supporting harvesting vehicle through standing plants during a harvesting operation. The standing plants are taken up by the intake arrangement 12, the cobs are separated and conducted to the harvesting vehicle, while the plant stalks are chopped by flails 14 and remain on the field. In the following the directions given, such as front, rear, below and above refer to the forward direction V of the harvesting implement 10.

Each intake arrangement 12 includes a gathering element 16 that can be rotated about the vertical axis. The gathering element 16 is provided with fingers 18 projecting approximately radially outward from the hub. The end regions of the fingers 18 are bent opposite to the direction of rotation in the trailing direction. The gathering element 16 directs the plants to the picking arrangement. Alongside the axis of rotation of the gathering element 16 is a picking gap 20. Two interacting picking rolls 22 and 24 are located under the picking gap 20. The front portion of the picking rolls 22 and/or 24 are equipped over at least part of their length with augers in order to direct the plant stalks into the picking gap 20 and to transport them to the rear through the picking gap 20. However, it would also be conceivable to transport the plants independent of the gathering elements 16 through the plucking gap, for example, by gathering chains or only by the picking rolls 22 and 24. Above the picking gap 20 and above the fingers 18 is an additional screw conveyor 26. The additional screw conveyor 26 is located on the side opposite the picking gap 20 and conveys more rapidly than the picking roll 22 arranged beneath it in order to improve the introduction of the plant stalks into the picking gap 20. The movable elements are brought into rotation by appropriate drives. The additional screw conveyor 26 is driven over the picking roll 22 by a gearbox 34 that is arranged on the forward side of the picking roll 22. A frame 36 retains the individual elements of the intake arrangement 12. It is fastened to the aforementioned carrier frame so that it can be slid to the side.

During the harvesting operation the plants are drawn into the picking gap 20 by means of the picking rolls 22 and 24 and pulled along the picking gap in interaction with the fingers 18 where the stands of fruit (cobs or the like) are separated from the plants and come to lie on stripper plates 28 and 30 that define the picking gap 20. From there they are conveyed to the rear by the fingers 18 and brought by means of a transverse screw conveyor, not shown, into the feeder house or the intake channel of the harvesting vehicle. A covering 32 above the axis of rotation of the gathering element 16 provides protection. The configuration and the operation of the intake arrangements 12 are disclosed in greater detail in published U.S. Patent application US2003/0079458 published 1 May 2003, whose disclosure is incorporated into the present application by reference.

Stalk dividers 38 are arranged in the forward operating direction V ahead of the intake arrangements 12 on both ends at the sides of the operating region of the individual intake arrangements 12, they are used to deflect to the side plant stalks standing outside the capture region of the fingers 18, so that they can be grasped by the fingers 18. The stalk dividers 38 are conical in shape with points directed to the front. Hence their cross section is substantially circular.

Figure 2:
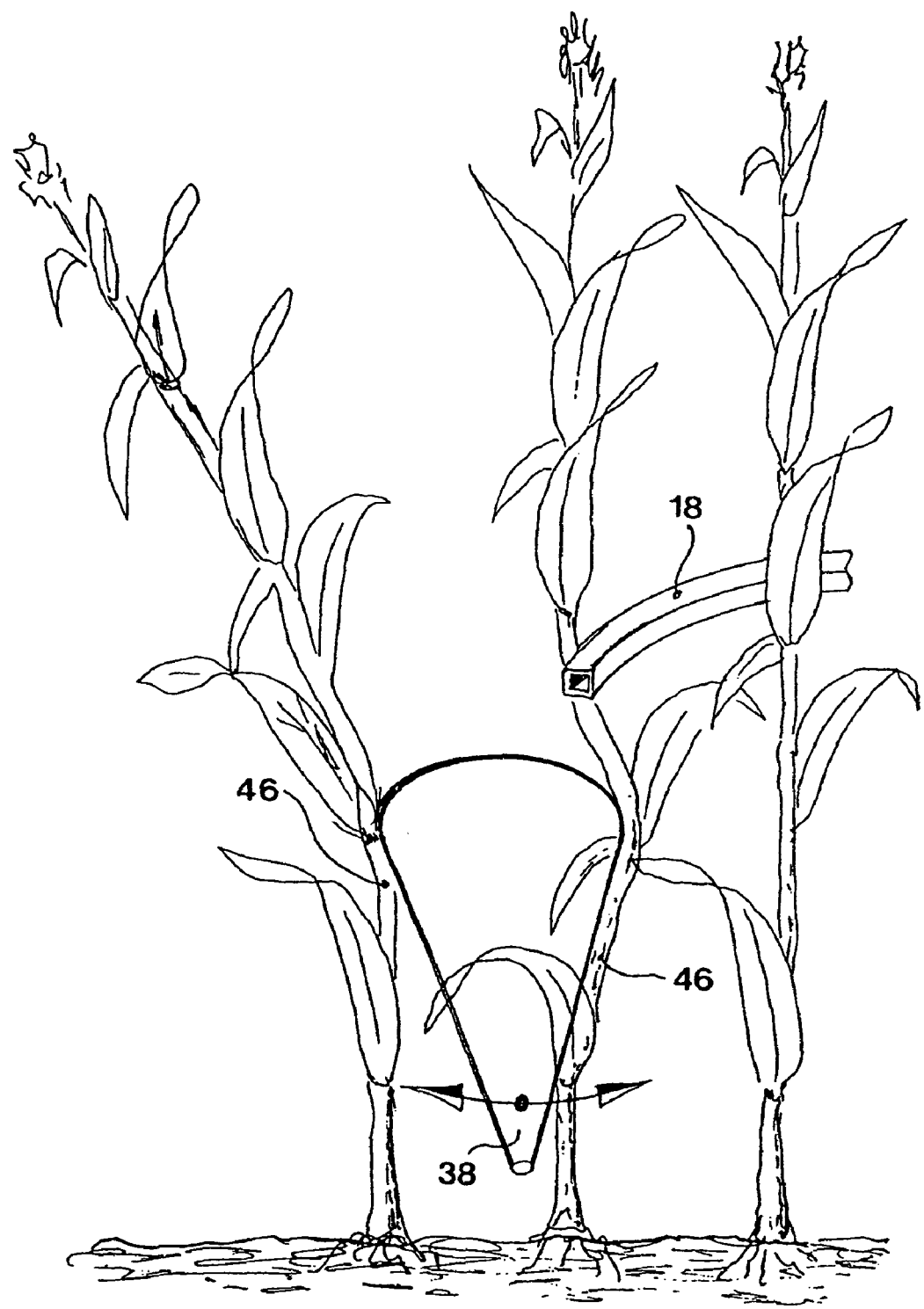
FIG. 2 is a perspective front view of the stalk divider of the harvesting implement of FIG. 1 during the harvesting operation.

Each stalk divider 38 is attached by a parallelogram guidance linkage 40 to the gearbox housing 34 so that they can move in the sideways direction. On the other hand the stalk divider attached at the far right of the harvesting implement 10 of FIG. 1 (not shown in the drawing) is fastened to the frame 36 of the adjoining intake arrangement 12. The parallelogram guidance linkage 40 includes two arms 42 extending parallel to each other that are fastened at their upper ends to a retainer 44 that is fastened to a suspension 45 at the gearbox housing 34. The lower ends of the two arms 42 are fastened to an interior carrier structure (not shown in the drawing) of the stalk divider 38, in each case about axes extending in the forward direction. Thereby the result is that the stalk dividers 38 are pre-loaded by the force of gravity into their rest position and can move in the sideways direction, as is indicated by the dashed outlines in FIG. 1. If the stalk divider 38 thereby knocks against the plant stalk 46, as is shown in FIG. 2, it can deflect in the sideways direction. An excessive bending of the plant stalks 46, that would lead to losses of cobs, is not to be feared, since the stalk divider 38 winds its way between the plant stalks 46. It may be useful to limit the sideways movement of the stalk dividers 38 by appropriate stops on its rear side, so that the introduction of the plants into the picking gap 20 is guaranteed even with the stalk divider 38 deflected to the side.

Figure 3:
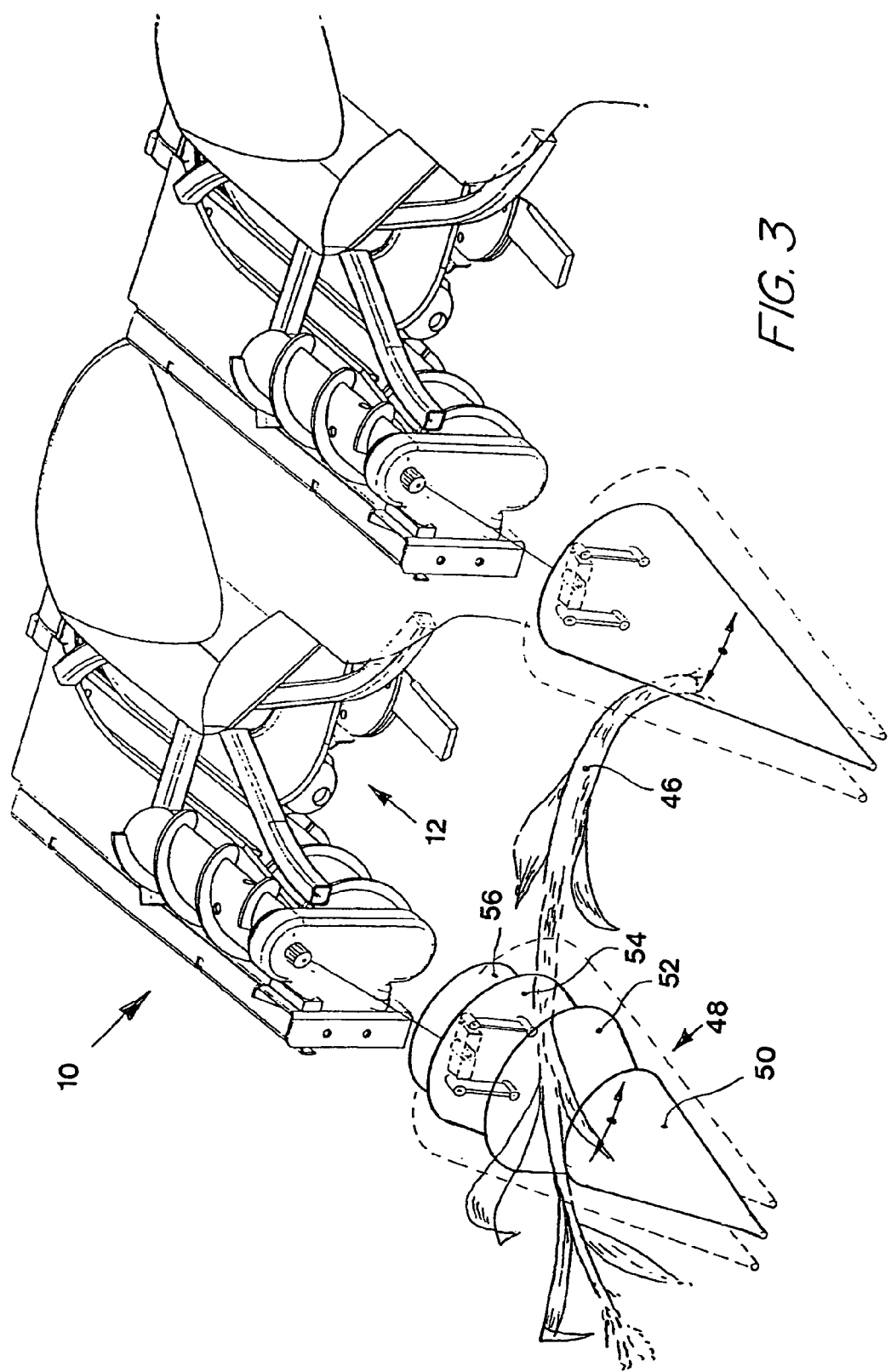
FIG. 3 is a perspective partial view of a harvesting implement with another embodiment of a stalk divider, located in the harvesting operating position.

FIG. 3 shows a second embodiment of a harvesting implement 10 according to the invention. The intake arrangements 12 are identical to those shown in FIG. 1, as is the parallelogram guidance linkage 40 on which the stalk dividers 48 are suspended so as to be able to move in the sideways direction. The stalk divider 48 differs from the stalk divider 38 of FIG. 1 only in the configuration of its surface. The stalk divider 48 is composed of individual truncated conical sections 50-56 that form steps in their transition regions with edges facing to the rear. Hence in the side view the surface of the stalk divider 48 is that of a saw-toothed cone. Thereby the result is that the plant stalk 46 that is forced downward by an adjacent stalk divider and rests upon the stalk divider 48 does not slide downward to the ground and is lost to the harvesting process, since it is in contact with a rear edge between the sections 50-56 and is prevented from sliding further. It is forced into the picking gap 20 by following plants. In this way losses during the harvest are reduced. As a rule all stalk dividers of the harvesting implement (in contrast to that shown in the drawing) are configured identically to the stalk divider 48 shown.

Figure 4:
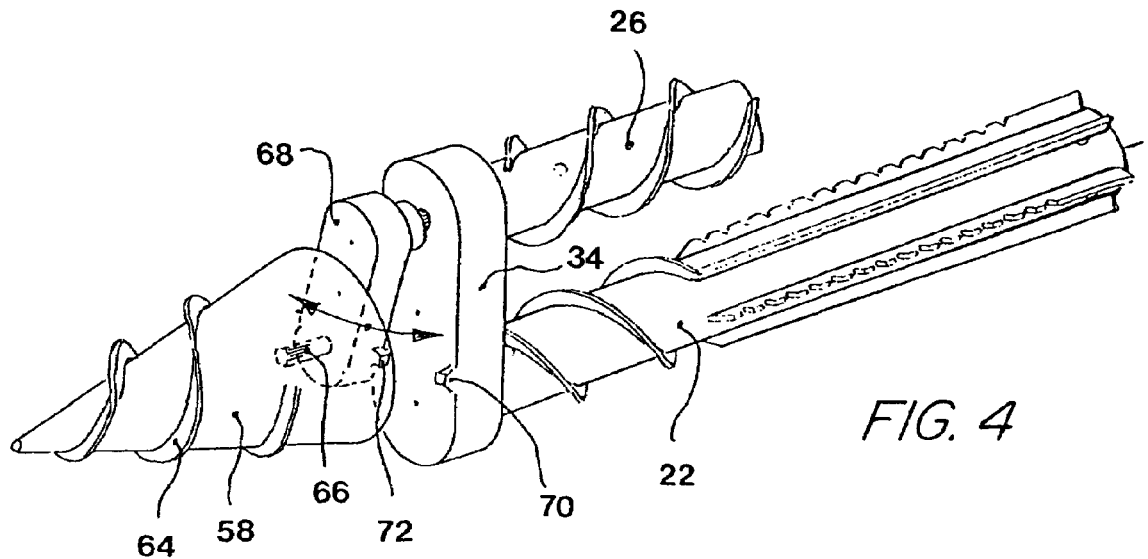
FIG. 4 is a perspective partial view of a harvesting implement with another embodiment of a stalk divider, located in the harvesting operating position.
Figure 5:
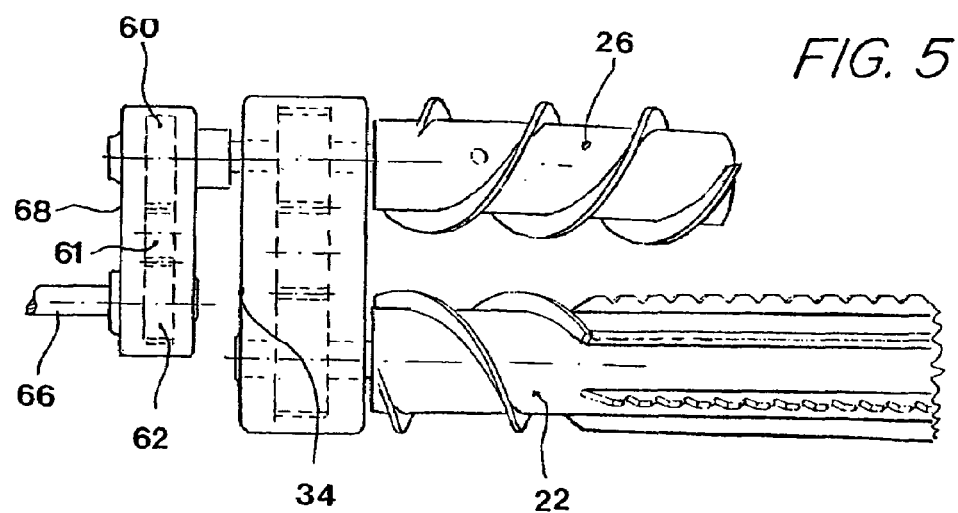
FIG. 5 shows a vertical lengthwise section through the retainer of the stalk divider of FIG. 4.

Finally, FIG. 4 shows a partial view of a third embodiment of a harvesting implement 10 according to the invention. The intake arrangements 12 correspond to those shown in FIG. 1 and are therefore not shown here. In contrast to the first two embodiments, the stalk dividers 58 can be brought into rotation about their longitudinal axes. For this purpose, the rotational movement of the additional screw conveyor 26 is transmitted from the first gear 60 over a second gear 61 to a third gear 62, as can be seen in the sectional view through the retainer 68 of the stalk divider 58, which is shown in FIG. 5. The first gear 60 is rotatively supported in bearings in retainer 68 and is driven by a shaft extending from the front of the gearbox 34. The first gear 60 in turn drives the second and third gears 61 and 62 also rotatively supported by bearings in the retainer 68. The axes of rotation of the first, second and third gears 60, 61 and 62 are parallel to one another and extend in the forward direction V. The third gear 62 is arranged coaxially to the conical stalk divider 58 that is equipped with helically shaped drivers 64 and rotates the stalk divider 58 through drive shaft 66. Since the retainer 68 is suspended pendulously about an axis extending in the forward direction V, the third gear 62 and the stalk divider 58 can also perform a pendulous movement in the sideways direction, as is indicated by the dashed lines. The stalk divider 58 is pre-loaded by the force of gravity into its rest position. In this embodiment it may also be useful to limit the range of motion of the stalk divider 58 by appropriate stops 70 and 72 on the retainer 68 and the gearbox housing 34. Alternatively or in addition, the stalk divider 58 could be pre-loaded into its rest position by springs and/or additional weights also to prevent it from deflecting to the side under the load of a plant that it should have lifted. The stalk divider 58 that can be moved to the side and can be brought into rotation makes it possible to raise lying plant stalks (lodged corn) from the ground and to insert them into the intake arrangement 12. For the stalk divider 58 arranged at the furthermost right a separate drive would be required, for example, a hydraulic motor, since it is not followed by a gearbox housing 34.

Embodiments are conceivable in which the stalk dividers 38, 48 and 58 remain in the positions shown. In other embodiments some or all of the stalk dividers 38, 48 and 58 can be brought into a transport position in which they are, for example, taken off the harvesting implement and stowed separately or are pivoted or slid upward, or downward, or to the side.

Having described the illustrated embodiments, it will become apparent that various modifications can be made without departing from the scope of the invention as defined in the accompanying claims.

The invention claimed is:

1. A harvesting implement for harvesting of stalk-like plants, with at least one intake arrangement for taking up plants located on a field and a stalk divider arranged ahead of the intake arrangement in a forward direction, the stalk divider is supported in bearings and can be deflected sideways during harvesting relative to the intake arrangement and transverse to the forward direction wherein the stalk divider is pendulously connected to the intake arrangement and wherein the stalk divider is connected with the harvesting implement so as to pivot about an approximately horizontal axis and wherein the stalk divider is connected to the intake arrangement pendulously with a parallelogram guidance linkage and wherein the stalk divider can be positively rotated about its longitudinal axis extending in the forward direction.

2. The harvesting implement as defined by claim 1 wherein the stalk divider is connected with the harvesting implement so as to slide transversely sideways relative to the forward direction.

3. The harvesting implement as defined by claim 1 wherein the stalk divider is connected with the harvesting implement so as to slide transversely to the forward direction.

4. The harvesting implement as defined by claim 1 wherein the stalk divider is connected with the intake arrangement so as to float freely relative to the intake arrangement.

5. The harvesting implement as defined by claim 1 wherein the stalk divider is equipped with conveying elements projecting from its surface.

6. The harvesting implement as defined by claim 5 wherein the conveying elements on the stalk divider are helical.

7. The harvesting implement as defined by claim 6 wherein the stalk divider is positively rotated by a drive extending from the intake arrangement.

8. The harvesting implement as defined by claim 1 wherein the stalk divider is provided with a circular cross section.

9. The harvesting implement as defined by claim 8 wherein the stalk divider has a conical shape.

10. The harvesting implement as defined by claim 8 wherein the stalk divider is composed of several stepped sections arranged behind each other in the forward direction.

11. The harvesting implement as defined by claim 10 wherein each section has a forward region and a rear region, the forward region is provided with a smaller radial dimension than the rear region of the section.

12. The harvesting implement as defined by claim 11 wherein the forward region of a first section is provided with a smaller radial dimension than the forward region of a second section located behind the first section.

13. The harvesting implement as defined by claim 1 wherein the intake arrangement is a picking arrangement.

14. The harvesting implement as defined by claim 13 wherein the intake arrangement comprises a gathering element driven so as to rotate about the vertical axis with fingers projecting outward for the grasping of the plants, the gathering element is arranged to move plant stalks into and along a plucking gap.

* * * * *